(12) United States Patent  (10) Patent No.: US 8,120,831 B2
Qian  (45) Date of Patent: Feb. 21, 2012

(54) MECHANICAL DEVICE FOR SWITCHING AN OPTICAL LENS FILTER FOR A CAMERA

(76) Inventor: Benning Qian, Ningbo (CN)

( * ) Notice: Subject to any disclaimer, the term of this patent is extended or adjusted under 35 U.S.C. 154(b) by 212 days.

(21) Appl. No.: 12/701,316

(22) Filed: Feb. 5, 2010

(65) Prior Publication Data

US 2010/0172036 A1    Jul. 8, 2010

(51) Int. Cl.
G02B 7/02 (2006.01)
G02B 5/22 (2006.01)

(52) U.S. Cl. .................. 359/214; 359/211; 359/889

(58) Field of Classification Search .......... 359/811–823, 359/694–704, 892, 885, 889, 353; 396/209, 396/241, 275; 348/143, 216.1, 224.1, 235, 348/270

See application file for complete search history.

(56) References Cited

U.S. PATENT DOCUMENTS

| 3,672,268 A | | 6/1972 | Scheibel et al. |
| 5,046,162 A | * | 9/1991 | Ishikawa et al. ............... 348/270 |
| 6,817,788 B1 | * | 11/2004 | Negishi et al. ................ 396/505 |
| 7,158,323 B2 | * | 1/2007 | Kim et al. ..................... 359/892 |
| 2007/0291157 A1 | | 12/2007 | Ding et al. |

* cited by examiner

*Primary Examiner* — Mohammed Hasan
(74) *Attorney, Agent, or Firm* — Head, Johnson & Kachigian, P.C.

(57) ABSTRACT

A mechanical device for selectively inserting an optical lens filter, such as day optical filter and a night optical filter, into an optical path of a camera in accordance with light intensity and/or a signal from a user or timer. The device for switching an optical lens filter may include a series of gears and a filter bracket slidably disposed within a housing, which moves between a first position and a second position in order to selectively insert at least one optical lens filter into the optical path of the camera.

19 Claims, 9 Drawing Sheets

MECHANICAL DEVICE FOR SWITCHING AN OPTICAL LENS FILTER FOR A CAMERA

BACKGROUND OF THE INVENTION

1. Field of the Invention

This invention relates generally to a device for switching an optical lens filter for a camera, and more particularly to a mechanical device for selective switching between at least one optical lens filter, such as between a day and night optical lens filter, between a first position and a second position in order to selectively insert the optical lens filter into an optical path of a camera.

2. Description of the Related Art

Game cameras are typically associated with hunters and the pursuit of big game animals, such as elk and deer. Game cameras have evolved from 35 mm film cameras into 6.0 megapixel digital infrared cameras. The primary purpose of a game camera is too capture an image of a deer or other game without invading their habitat and spooking the animal, giving hunters the ability to tell where game is located for preseason scouting. The information tells hunters where to best place their blind or tree-stand.

It is therefore desirable to provide a device for selective and/or automated switching an optical lens filter for a camera. It is further desirable to provide a device for selective switching between at least one optical lens filter, such as between a day and night optical lens filter, between a first position and a second position in order to selectively insert the optical lens filter into an optical path of a camera.

SUMMARY OF THE INVENTION

In general, in a first aspect, the invention relates to a mechanical device for switching an optical lens filter for a camera having a filter bracket with at least one optical lens filter and a motor having an axle. The filter bracket is slidably disposed within a housing and includes an axial series of projecting teeth. The motor is also secured to the housing. The rotational energy provided to the axle by the motor is converted to linear movement of the filter bracket within the housing for moving between a first position and a second position in order to selectively insert the optical lens filter into an optical path of a camera. The optical lens filter may be a day optical lens filter and a night optical lens filter. Additionally, the motor can be secured to a motor housing using a motor bracket. Also, the filter bracket may be slidably disposed within a recessed sliding channel of the housing.

A first spur gear can be engaged with a drive gear on the axle of the motor and engaged with a second spur gear, while the second spur gear may be engaged with the axial series of projecting teeth of the filter bracket. More particularly, an outer cog of the first spur gear may be engaged with the drive gear and an inner cog of the first spur gear may engaged with an outer cog of the second spur gear. An inner cog of the second spur gear can be in turn engaged with the axial series of projecting teeth of the filter bracket. The filter bracket can include a rack-like channel having the axial series of projecting teeth. The drive gear, the first spur gear and the second spur gear would have parallel axis of rotation, with the liner movement of the filter bracket being substantially perpendicular to the axis of rotation of the drive gear, the first spur gear and the second spur gear. The drive gear, the first spur gear and the second spur gear can be disposed within a recessed gear box enclosure of the housing.

Alternatively, a first spur gear may be engaged with a drive gear on the axle of the motor and with a second spur gear. The second spur gear may be engaged with an output gear, which in turn may be engaged with the axial series of projecting teeth of the filter bracket. More particularly, an outer cog of the first spur gear can be engaged with the drive gear, while an inner cog of the first spur gear is engaged with an outer cog of the second spur gear. The second spur gear can include an axle having the output gear engaged with the axial series of projecting teeth of the filter bracket. The filter bracket can include a rack having the axial series of projecting teeth. In addition, the drive gear, the first spur gear, the second spur gear and the output gear can have parallel axis of rotation, with the liner movement of the filter bracket is substantially perpendicular to the axis of rotation of the drive gear, the first spur gear, the second spur gear and the output gear.

Moreover, a gear box housing may be secured to the housing, with the gear box housing having a gear box case and a gear box cover. The drive gear, the first spur gear and the second spur gear can be disposed within the gear box case, with the motor being disposed within a motor housing in the gear box cover. In addition, a control circuit electrically connected to the motor, with the control circuit having a directional driving circuit and a protection circuit.

In general, in a second aspect, the invention relates to a method of selectively inserting an optical lens filter into an optical path of a camera by providing a device for switching an optical lens filter for a camera, detecting an environmental luminance at the optical path of the camera, and beginning an algorithm with the control circuit to compare the environmental luminance to a predetermined value. If the environmental luminance exceeds the predetermined value, a daytime mode is activated with the control circuit, and for example, the day optical lens filter may be inserted in the optical path of the camera. If the environmental luminance does not exceed the predetermined value, a nighttime mode is activated with the control circuit, and for example, the night optical lens filter may be inserted in the optical path of the camera. A protection circuit may also be utilized if the control circuit detects an unusual status.

Other advantages and features will be apparent from the following description, and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the construction and the arrangement of the structural and function details disclosed herein without departing from the spirit and scope of this disclosure. It is understood that the devices and methods are not limited to the embodiments set forth herein for purposes of exemplification.

Referring to the figures of the drawings, wherein like numerals of reference designate like elements throughout the several views, and initially to FIGS. 1 through 4, a mechanical device for switching an optical lens filter for a camera 10 having a housing 94 with an opening 80 through which the optical path of the camera may pass. Slidably disposed within the housing 94 is a filter bracket 70 that moves between a first position (FIG. 3) and a second position (FIG. 4) in order to selectively insert the optical lens filter 18 into the optical path of the camera. As exemplified, the housing 94 may include a recessed gear box enclosure 108 and a recessed sliding channel 110 within which the filter bracket 70 moves. By way of illustration only, the optical lens filter 18 may be a day optical lens filter 18a and a night optical lens filter 18b secured to the slidable filter bracket 70 within openings 82a and 82b. In addition to openings 82a and 82b, the filter bracket 70 may include an elongated, rack-like channel 96 having an axial series of projecting teeth 98.

Figure 1:
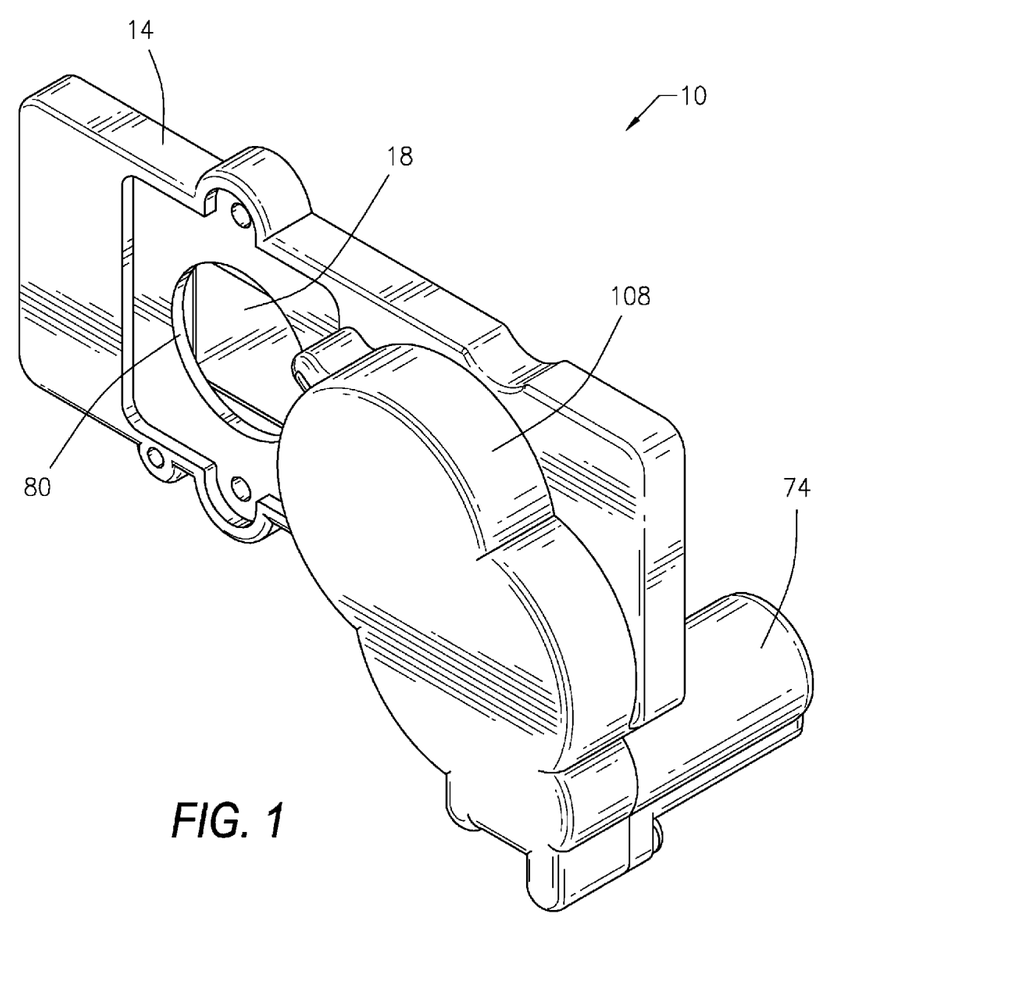
FIG. 1 is a perspective view of an example of a mechanical device for switching an optical lens filter for a camera in accordance with an illustrative embodiment of the mechanical device for switching an optical lens filter for a camera disclosed herein.
Figure 2:
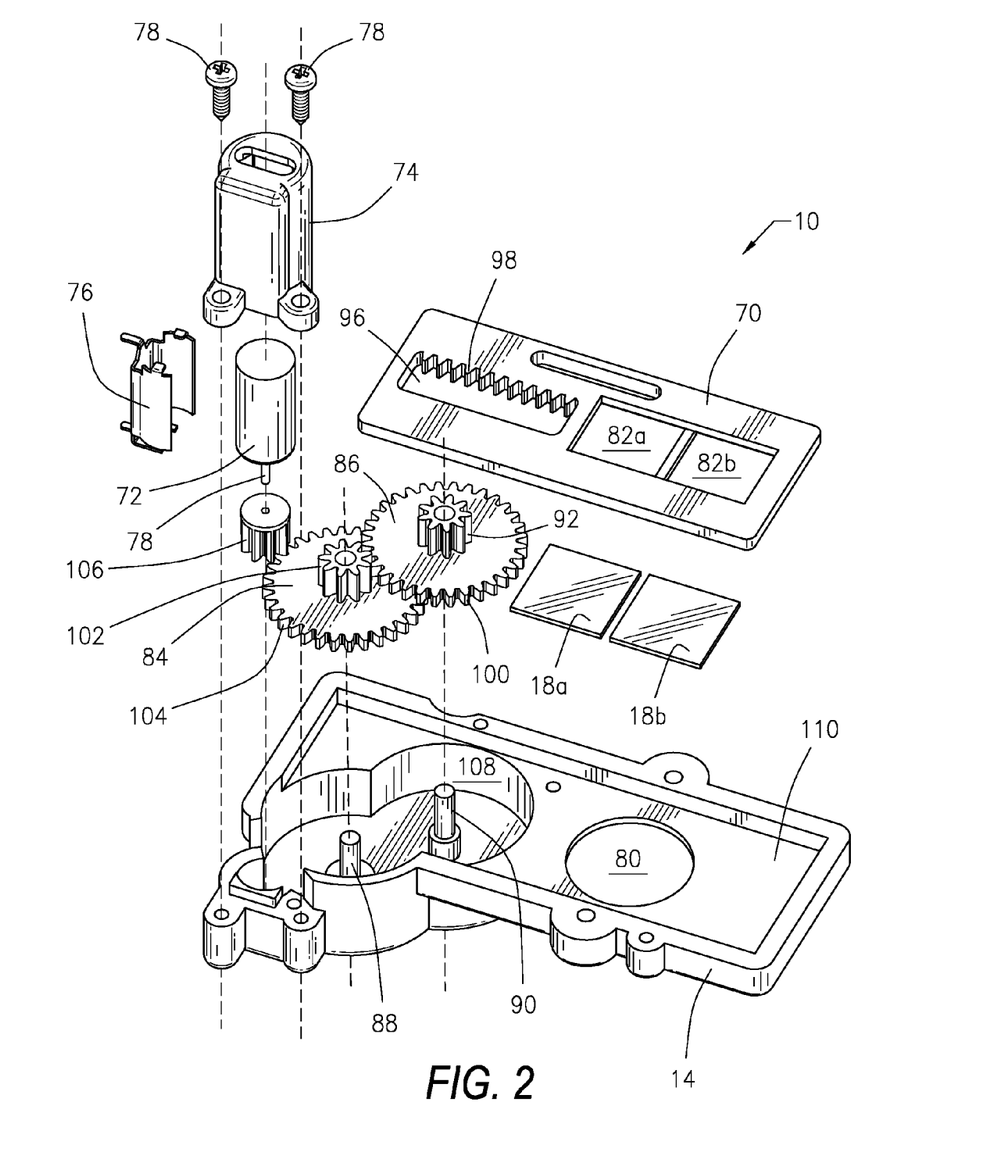
FIG. 2 is an exploded view of the mechanical device for switching an optical lens filter for a camera as shown in FIG. 1.
Figure 3:
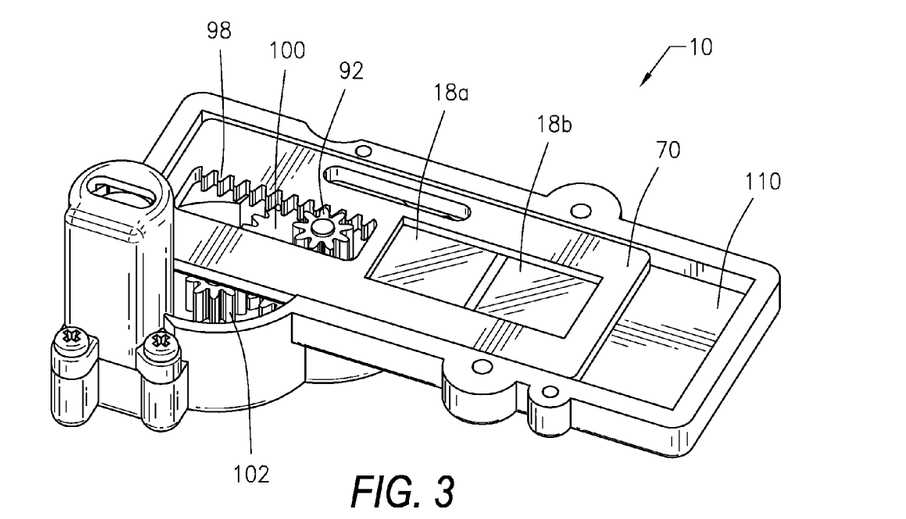
FIG. 3 is a perspective view of the mechanical device for switching an optical lens filter for a camera of FIG. 1 with an optical lens filter in a first position.
Figure 4:
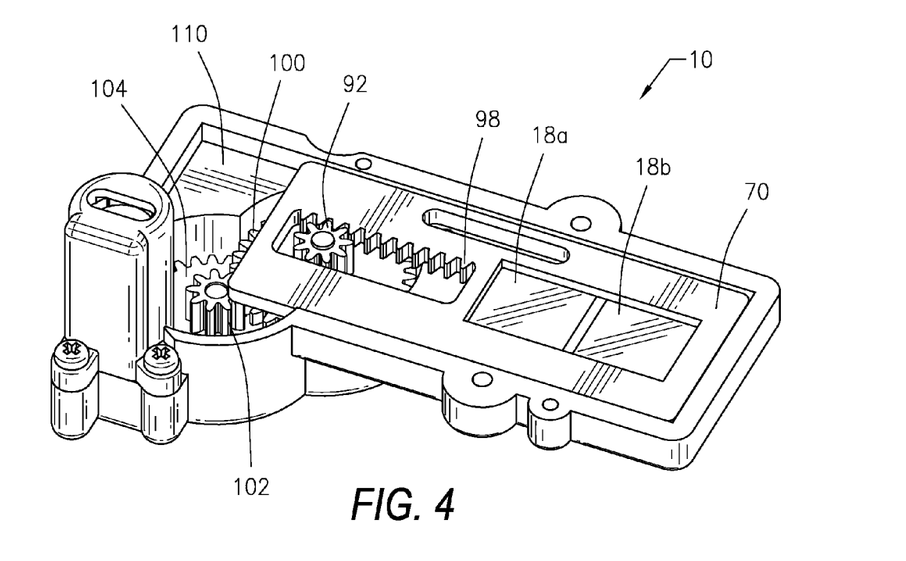
FIG. 4 is a perspective view of the mechanical device for switching an optical lens filter for a camera of FIG. 1 with the optical lens filter in a second position.
Figure 5:
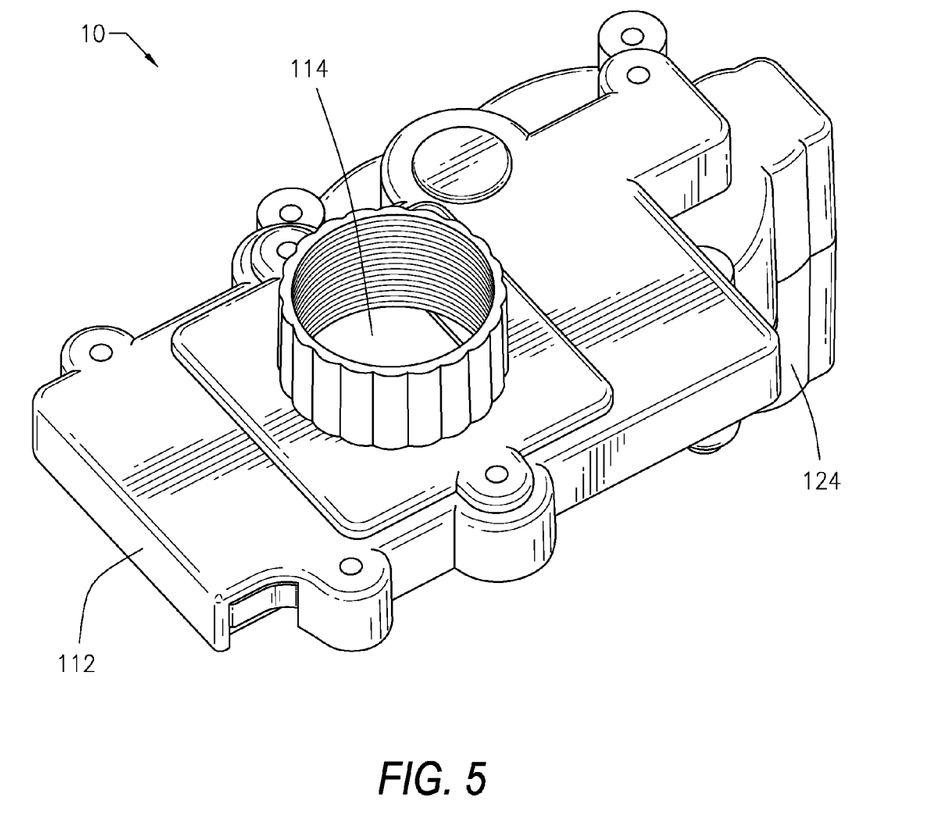
FIG. 5 is a perspective view of another example of a mechanical device for switching an optical lens filter for a camera in accordance with an illustrative embodiment of the mechanical device for switching an optical lens filter for a camera disclosed herein.

As can be seen from the exploded view of FIG. 2, motor 72, which may be electric, hydraulic or other rotating power supply, has an axle 78 and may be housed within a motor housing 74 that is secured to the housing 94 by way of a suitable fastener, such as shown with screws 78. The motor 72 is mounted within the motor housing 74 using a motor bracket 76. During operation, the rotational energy of the axle 78 of the motor 72 is converted to linear movement of the filter bracket 70 for selectively inserting the day optical lens filter 18a (FIG. 4) or the night optical lens filter 18b (FIG. 3) over opening 80 in the housing 14 and into the optical path of the camera. For example and as illustrated in FIGS. 2 through 4, a pair of spur gears 84 and 86 may be rotatably mounted on the housing 14 by way of housing axles 88 and 90 located within the recessed gear case 108. The axle 78 of the motor 72, the housing axle 88 forming the axis of rotation of the spur gear 84 and the housing axle 90 forming the axis of rotation of the spur gear 86 are aligned in parallel. The spur gear 86 has an inner cog 92 engaged with the axial series of teeth 98 in the channel 96 of the filter bracket 70. The spur gear 86 also includes an outer cog 100 engaged with an inner cog 102 of the spur gear 84. The spur gear 84 includes an outer cog 104, which is engaged with a drive gear 106 secured to the axle 78 of the motor 72.

During operation, the motor 72 rotates the axle 78 having the drive gear 106; the rotational energy of the drive gear 106 causes the spur gear 84 to rotate about the housing axle 88; the rotational energy of the spur gear 84 is transmitted to the spur gear 86, causing it to rotate about the housing axle 90; this rotational energy of the spur gear 86 is converted to linear movement of the filter bracket 70 within the slide channel 110 of the housing 94 between the first position illustrated in FIG. 3 and the second position illustrated in FIG. 4.

Referring now to FIGS. 5 through 8, a housing 112 of the device for switching an optical lens filter for a camera 10 may include an opening 114 through which the optical path of the camera may pass. Slidably disposed within the housing 112 is a filter bracket 116 that moves between a first position (FIG. 7) and a second position (FIG. 8) in order to selectively insert the optical lens filter 18 into the optical path of the camera. As exemplified, the housing 112 may include a recessed sliding channel 118 within which the filter bracket 116 moves. The filter bracket 116 may include a day optical lens filter 18a and a night optical lens filter 18b secured within openings 120a and 120b. In addition to openings 120a and 120b, the filter bracket 118 may include a rack 122 having an axial series of projecting teeth.

A gear box housing 124, attached to the housing 112, includes a gear box case 126 and a gear box cover 128 secured thereto, such as by way of screws 130. The gear box case 126 includes a housing axle 152 about which a spur gear 144 rotates. In addition, the gear box case 126 includes an opening 154 through which an axle 156 extends through. Within the gear box cover 128, a motor bracket 132 secures a motor 134 to a motor housing 136.

The motor 134 includes an axle 138 having a drive gear 140. The drive gear 140 is engaged with an outer cog 142 of the spur gear 144, while an inner cog 146 of the spur gear 144 is engaged with an outer cog 148 of a spur gear 150. The axis of rotation of the spur gear 150 is secured to the axle 156, which extends from within the gearing box housing 124, through the opening 154 therein, and into the housing 112 where it includes an output gear 158. The output gear 158 is engaged with the rack 112 of the filter bracket 118.

During operation, the axle 138 of the motor 134 rotates the drive gear 140, causing the spur gear 144 to rotate, which in turn causes the spur gear 150 to rotate. The rotation of the spur gear 150 is transmitted through the axle 156 to the output gear 158. The rotational energy of the output gear 158 is converted by the rack 122 to linear movement of the filter bracket 116 along and within the sliding channel 118 of the housing 112. This linear movement of the filter bracket 116 of the device for switching an optical lens filter for a camera 10 enables the selective switching between the day optical lens filter 18a (FIG. 7) or the night optical lens filter 18b (FIG. 8) being inserted into the optical path of the camera, such as in accordance with light intensity and/or a signal from the user or timer.

Figure 7:
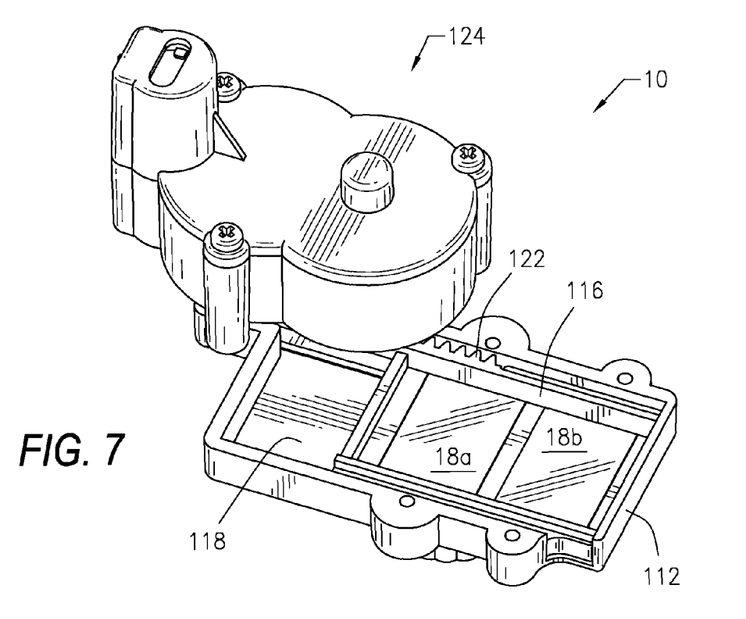
FIG. 7 is a perspective view of the mechanical device for switching an optical lens filter for a camera of FIG. 5 with an optical lens filter in a first position.
Figure 8:
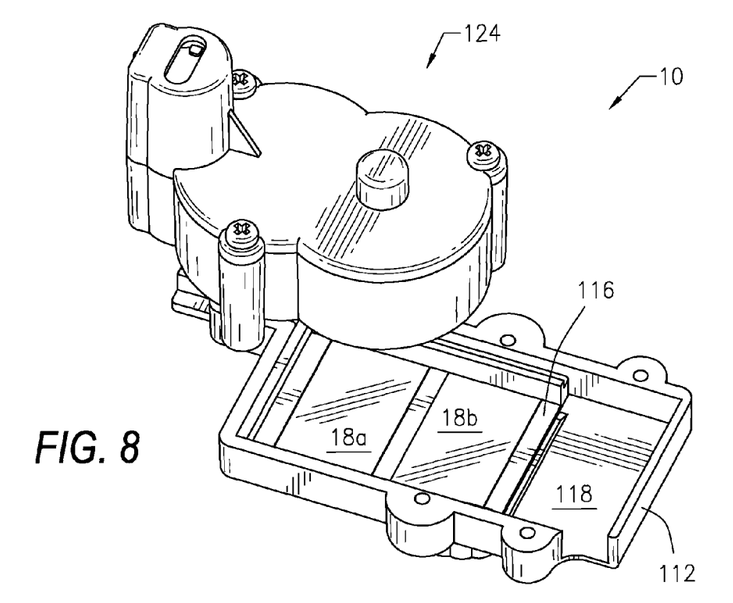
FIG. 8 is a perspective view of the mechanical device for switching an optical lens filter for a camera of FIG. 5 with the optical lens filter in a second position.
Figure 9:
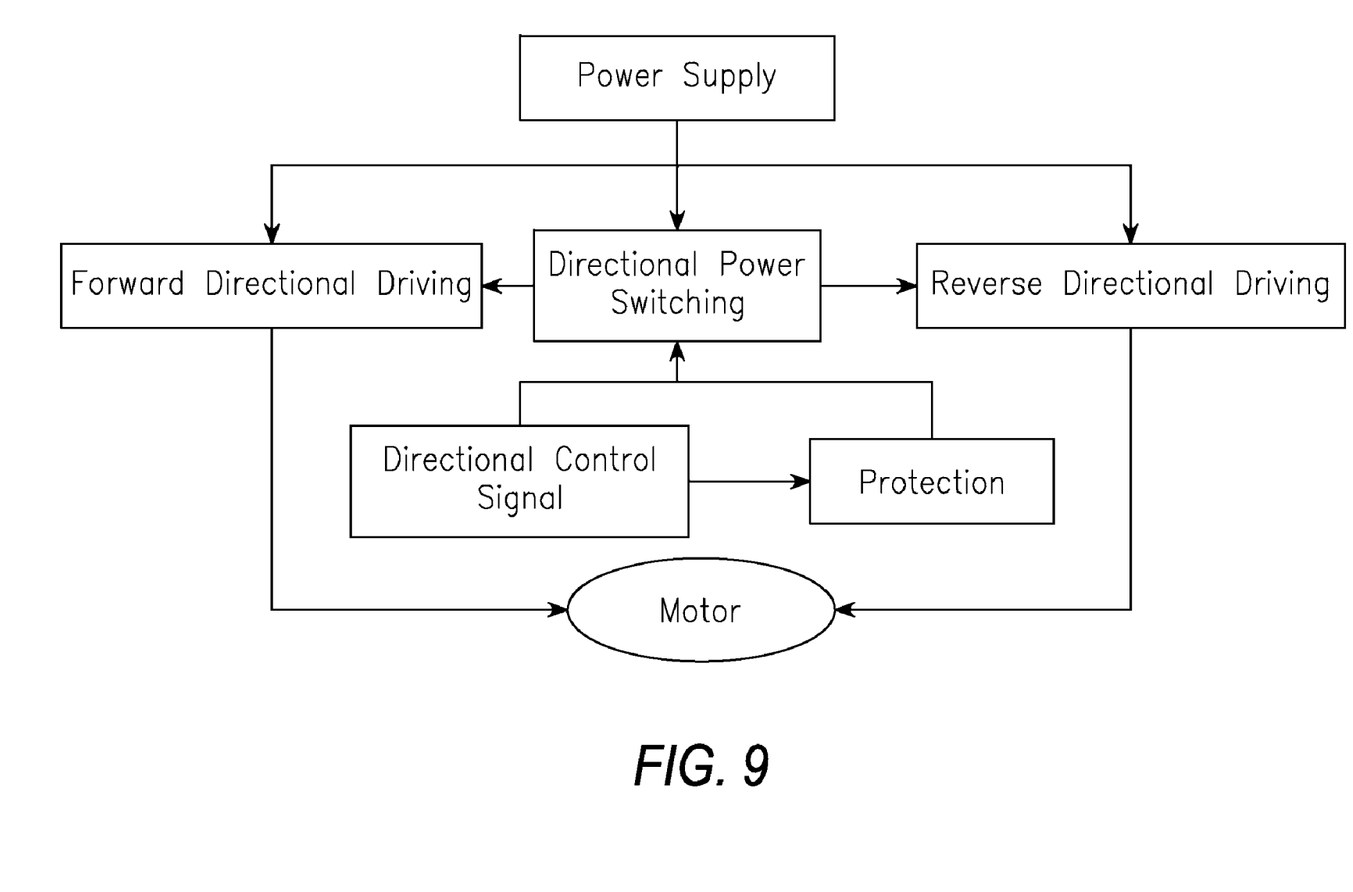
FIG. 9 is a flow chart of an example of a process flow of a control circuit in accordance with an illustrative embodiment of the mechanical device for switching an optical lens filter for a camera disclosed herein.
Figure 10:
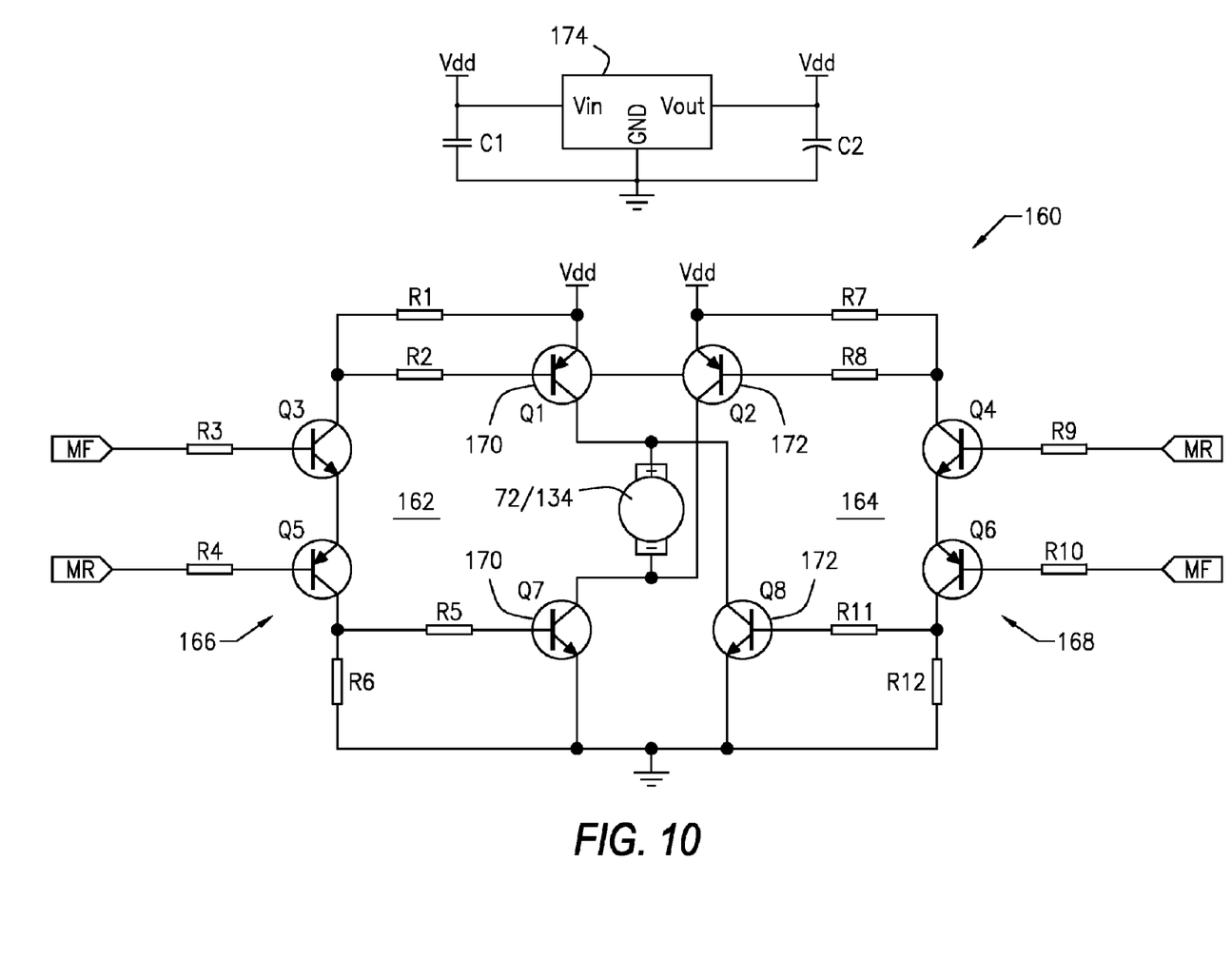
FIG. 10 is an electrical schematic of an example of a control circuit having a directional driving circuit and a protection circuit in accordance with an illustrative embodiment of the mechanical device for switching an optical lens filter for a camera disclosed herein.
Figure 11:
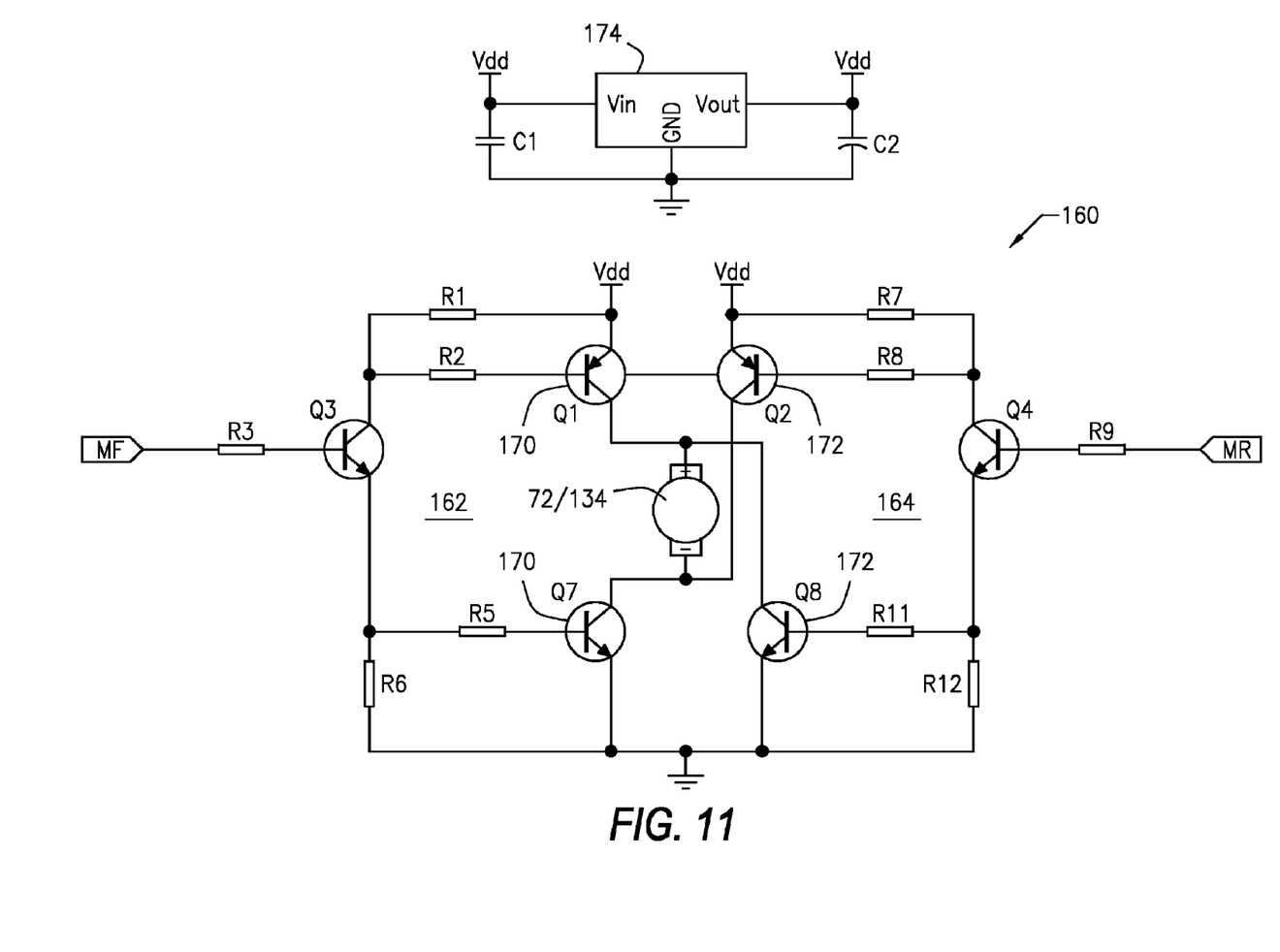
FIG. 11 is an electrical schematic of an example of a control circuit having a directional driving circuit in accordance with an illustrative embodiment of the mechanical device for switching an optical lens filter for a camera disclosed herein.

Referring now to FIGS. 9 through 11, a control circuit 160, such as exemplified in FIG. 10 or 11, may be utilized to determine the position of and to move the filter bracket 70/116 between the first position illustrated in FIGS. 3 and 7 and the second position illustrated in FIGS. 4 and 8. The control circuit 160 may be composed of a directional driving circuit with or without a protection circuit. As illustrated in FIG. 10, the control circuit 160 includes both the directional driving circuit, which includes both a forward directional driving circuit 162 and a reverse directional driving circuit 164, and a forward protection circuit 166 and a reverse protection circuit 168, while FIG. 11 exemplifies the control circuit 160 without the protection circuits 166 and 168. As illustrated for purposes of exemplification only and not by way of limitation, the forward directional driving circuit 162 and the forward protection circuit 166 include resistors R1, R2, R3, R4, R5 and R6 and transistors Q3 and Q5, and the reverse directional driving circuit 164 and the reverse protection circuit 168 include resistors R7, R8, R9, R10, R11 and R12 and transistors Q3 and Q5. The forward protection circuit 166 may be composed by resistor R5 and transistor Q5, while the reverse protection circuit 168 may be composed by resistor R10 and Q6, as illustrated in FIG. 10. Transistors Q1 and Q7 may be for a forward directional power switching circuit 170 that allows the motor 72/134 to run in a forward direction, while transistors Q2 and Q8 may be for a reverse directional power switching circuit 172 that allows the motor 72/134 to run in a reverse direction.

The device for switching an optical lens filter for a camera 10 may include an image sensor (not shown) that detects the environmental luminance. The image sensor is electrically connected to the control circuit 160, which may also include a suitable processor 174, such as a digital signal processor or micro-controller unit. If the detected luminance is greater than a predetermined value, the control circuit 160 will enter a daytime mode. In the daytime mode, the optical lens filter 18a may cover the opening 80/114 and be in the optical path of the camera (FIGS. 4 and 8). If the detected luminance is less than the predetermined value, the control circuit 160 will enter a nighttime mode. In the nighttime mode, the optical lens filter 18b may cover the opening 80/114 and be in the optical path of the camera (FIGS. 3 and 7).

The processor 174 will provide either a forward directional control signal (MF) or a reverse directional control signal (MR) according to the detected luminance. For example, the forward directional driving circuit 162 may be activated with MF=1 and MR=0, while the reverse directional driving 164 circuit may be activated with MF=0 and MR=1, with 1 representing the predetermined value for high luminance and 0 representing the predetermined value for low luminance. By way of further example, when MF=1 and MR=0, the transistors Q4 and Q6 are electrically disconnected, resulting in transistors Q2 and Q8 also being electrically disconnected, such that the reverse directional power switching circuit 172 is disconnected. Transistors Q3 and Q5 are electrically connected resulting in transistors Q1 and Q7 being electrically connected; in this state, the forward directional power switching circuit 170 is electrically connected resulting in a positive voltage between positive to negative terminals of the motor 72/134. This voltage causes the motor 72/134 to rotate in the forward direction and move the optical lens filter 18a into the optical path of the camera. Should MF=0 and MR=1, the transistors Q3 and Q5 would be disconnected, along with transistors Q1 and Q7, in order to disconnect the forward directional power switching circuit 170. Transistors Q4 and Q6 are electrically connected, resulting in transistors Q2 and Q8 to also be electrically connected so that the reverse directional power switching circuit 172 is active. A negative voltage is applied between the negative to positive terminals of the motor 72/134, causing the motor 72/134 to rotating in the reverse direction and move the optical lens filter 18b into the optical path of the camera.

If both MF and MR equaled 0, then the transistors Q1, Q3, Q5 and Q7 of the forward directional driving circuit 162 and the forward directional power switching circuit 170 and the transistors Q2, Q4, Q6 and Q8 of the reverse driving circuit 164 and the reverse directional power switching circuit 172 would be electrically disconnected resulting in no voltage between the positive and negative terminals of the motor 72/134 of the device for switching an optical lens filter for a camera 10. In this state, the motor 72/134 is in a non-working status and leaves the optical lens filter 18 in its existing position. The same may be true in an unusual status where both MF and MR equaled 1; in particular, transistors Q3 and Q5, along with transistors Q4 and Q6 would be electrically disconnected, deactivating both the forward and the reverse directional power switching circuits 170 and 172, respectively. No voltage would pass across the terminals of the motor 72/134 and the filter bracket 70/116 would remain in its existing position.

The protection circuits 166 and/or 168 illustrated in FIG. 10 are not typically activated during the directional driving circuits 162 and/or 164. During power up, the output signal of the processor 174 is typically not sufficiently stable, causing the MF and MR to both equal 1. Without the protection circuits 166 and/or 168, the forward and the reverse directional power switching circuit 170 and 172 would be simultaneously electrically connected, resulting in a short circuit between the power supply (Vdd) and the ground (GND) of the processor 174 by transistors Q1 and Q8 and transistors Q2 and Q7 all being simultaneously electrically connected. The large voltage surge causes the transistors to malfunction. The protection circuits 166 and/or 168 ensure that the proper directional control signal (MF and/or MR) is provided for the power switching circuit 170 and/or 172, prevents the control circuit 160 from working on an unusual status, and protects the driving components (e.g., the motor 72/134).

It will be appreciated that the device for switching an optical lens filter for a camera 10 may include any type of optical lens filter 18 typically used in photography; for example and not by way of limitation, the optical lens filter may be clear, ultraviolet, color correction, color subtraction, contrast enhancement, infrared, neutral density, polarizing, special effects or other type of photography or videography optical filter or a combination thereof. For example and not by way of limitation, the device for switching an optical lens filter for a camera 10 may utilize a day and a night optical lens filter as discussed infra, a clear optical lens filter and a day optical lens filter, or a clear optical lens filter and a night optical lens filter.

Whereas, the devices and methods have been described in relation to the drawings and claims, it should be understood that other and further modifications, apart from those shown or suggested herein, may be made within the spirit and scope of this invention.

What is claimed is:

1. A device for switching an optical lens filter for a camera, said device comprising:
  a filter bracket having at least one optical lens filter, said filter bracket slidably disposed within a housing, and said filter bracket having an axial series of projecting teeth;
  a motor having an axle and being secured to said housing;
  a first spur gear engaged with a drive gear on said axle of said motor, said first spur gear engaged with a second spur gear, and said second spur gear engaged with said axial series of projecting teeth of said filter bracket;
  wherein the rotational energy provided to said axle by said motor is converted to linear movement of said filter bracket within said housing for moving between a first position and a second position in order to selectively insert said at least one optical lens filter into an optical path of a camera.

2. The device of claim 1 wherein said at least one optical lens filter is selected from the group consisting of a clear optical lens filter, an ultraviolet optical lens filter, a color correction optical lens filter, a color subtraction optical lens filter, a contrast enhancement optical lens filter, an infrared optical lens filter, a neutral density optical lens filter, a polarizing optical lens filter, a special effects optical lens filter, a day optical lens filter or a night optical lens filter.

3. The device of claim 1 wherein said filter bracket is slidably disposed within a recessed sliding channel of said housing.

4. The device of claim 1 wherein said motor is secured to a motor housing a motor bracket.

5. The device of claim 1 wherein an outer cog of said first spur gear is engaged with said drive gear, wherein an inner cog of said first spur gear is engaged with an outer cog of said second spur gear, and wherein an inner cog of said second spur gear is engaged with said axial series of projecting teeth of said filter bracket.

6. The device of claim 5 wherein said filter bracket further comprises a rack-like channel having said axial series of projecting teeth.

7. The device of claim 1 wherein said drive gear, said first spur gear and said second spur gear have parallel axis of rotation.

8. The device of claim 7 wherein said liner movement of said filter bracket is substantially perpendicular to said axis of rotation of said drive gear, said first spur gear and said second spur gear.

9. The device of claim 1 wherein said drive gear, said first spur gear and said second spur gear are disposed within a recessed gear box enclosure of said housing.

10. The device of claim 1 further comprising said second spur gear engaged with an output gear, said output gear engaged with said axial series of projecting teeth of said filter bracket.

11. The device of claim 10 wherein an outer cog of said first spur gear is engaged with said drive gear, wherein an inner cog of said first spur gear is engaged with an outer cog of said second spur gear, wherein said second spur gear includes an axle having said output gear engaged with said axial series of projecting teeth of said filter bracket.

12. The device of claim 10 wherein said filter bracket further comprises a rack having said axial series of projecting teeth.

13. The device of claim 10 wherein said drive gear, said first spur gear, said second spur gear and said output gear have parallel axis of rotation.

14. The device of claim 13 wherein said liner movement of said filter bracket is substantially perpendicular to said axis of rotation of said drive gear, said first spur gear, said second spur gear and said output gear.

15. The device of claim 10 further comprising a gear box housing secured to said housing, wherein said gear box housing has a gear box case and a gear box cover, wherein said drive gear, said first spur gear and said second spur gear are disposed within said gear box case, and wherein said motor is disposed within a motor housing in said gear box cover.

16. The device of claim 1 further comprising a control circuit electrically connected to said Motor.

17. The device of claim 16 wherein said control circuit comprises a directional driving circuit and a protection circuit.

18. A method of selectively inserting an optical lens filter into an optical path of a camera, said method comprising the steps of:
  providing a device for switching an optical lens filter for a camera, said device comprising:
    a filter bracket having at least at least one optical lens filter, said filter bracket slidably disposed within a housing, said filter bracket having an axial series of projecting teeth;
    a motor having an axle and being secured to said housing; and
    a control circuit electrically connected to said motor;
    wherein the rotational energy provided to said axle by said motor is converted to linear movement of said filter bracket within said housing for moving between a first position and a second position in order to selectively insert said at least one optical lens filter into an optical path of a camera;
  detecting an environmental luminance at said optical path of said camera;
  beginning an algorithm with said control circuit to compare said environmental luminance to a predetermined value;
  if said environmental luminance exceeds said predetermined value, entering a daytime mode with said control circuit; and
  if said environmental luminance does not exceed said predetermined value, entering a nighttime mode with said control circuit.

19. The method of claim 18 further comprising the step of entering a protection circuit if said control circuit detects an unusual status.

* * * * *

UNITED STATES PATENT AND TRADEMARK OFFICE
CERTIFICATE OF CORRECTION

| | | |
|---|---|---|
| PATENT NO. | : 8,120,831 B2 | |
| APPLICATION NO. | : 12/701316 | |
| DATED | : February 21, 2012 | |
| INVENTOR(S) | : Benning Qain | |

Figure 6:
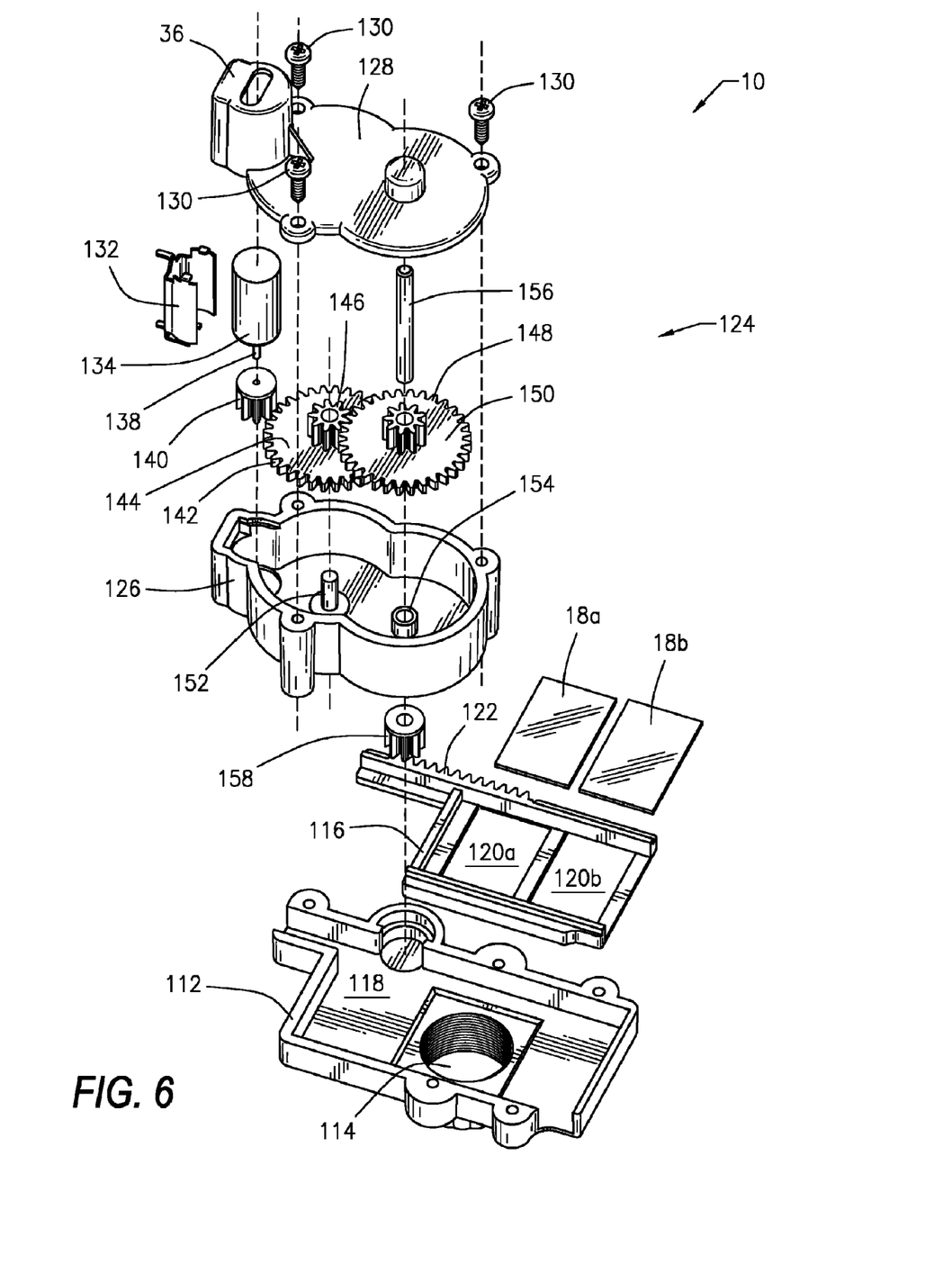
FIG. 6 is an exploded view of the mechanical device for switching an optical lens filter for a camera as shown in FIG. 5.

It is certified that error appears in the above-identified patent and that said Letters Patent is hereby corrected as shown below:

In the drawings, Sheet 5, Fig. 6, the reference numeral "36" should read --136--

Column 4, line 30, the reference numeral "118" should read --116--

Column 4, line 48, the reference numeral "112" should read --122--

Column 4, line 48, the reference numeral "118" should read --116--

Column 8, line 14, the text "Motor" should read --motor--

Signed and Sealed this
Twenty-fifth Day of September, 2012

David J. Kappos
*Director of the United States Patent and Trademark Office*